(12) United States Patent
Samuelsson et al.

(10) Patent No.: US 11,570,456 B2
(45) Date of Patent: Jan. 31, 2023

(54) APPARATUS AND METHODS THEREOF FOR VIDEO PROCESSING

(71) Applicant: TELEFONAKTIEBOLAGET LM ERICSSON (PUBL), Stockholm (SE)

(72) Inventors: Jonatan Samuelsson, Stockholm (SE);
Bo Burman, Upplands Väsby (SE);
Rickard Sjöberg, Stockholm (SE);
Magnus Westerlund, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 85 days.

(21) Appl. No.: 17/025,086

(22) Filed: Sep. 18, 2020

(65) Prior Publication Data
US 2021/0006808 A1   Jan. 7, 2021

Related U.S. Application Data

(63) Continuation of application No. 16/193,488, filed on Nov. 16, 2018, now Pat. No. 10,819,998, which is a
(Continued)

(51) Int. Cl.
*H04N 19/70* (2014.01)
*H04N 19/436* (2014.01)
(Continued)

(52) U.S. Cl.
CPC ......... *H04N 19/436* (2014.11); *H04N 19/156* (2014.11); *H04N 19/196* (2014.11); *H04N 19/46* (2014.11); *H04N 19/70* (2014.11)

(58) Field of Classification Search
CPC ............... H04N 19/436; H04N 19/156; H04N 19/196; H04N 19/46; H04N 19/70
See application file for complete search history.

(56) References Cited

U.S. PATENT DOCUMENTS

2003/0149928 A1   8/2003   Ting et al.
2011/0096826 A1*  4/2011   Han ..................... H04N 19/119
                                                   375/240.01
(Continued)

OTHER PUBLICATIONS

Lindbergh D: "The H.324 Multimedia Communication Standard", IEEE Communications Magazine, IEEE Service Center, Piscataway, US, vol. 34, No. 12, Dec. 1, 1996 (Dec. 1, 1996), pp. 46-51, XP000636453, ISSN: 0163-6804, DOI: 10.1109/35.556486.

(Continued)

*Primary Examiner* — Dave Czekaj
*Assistant Examiner* — Berteau Joisil
(74) *Attorney, Agent, or Firm* — Rothwell, Figg, Ernst & Manbeck, P.C.

(57) ABSTRACT

A method to be performed by a receiving apparatus for decoding an encoded bitstream representing a sequence of pictures of a video stream is provided. In the method, capabilities relating to level of decoding parallelism for the decoder are identified, a parameter indicative of the decoder's capabilities relating to level of decoding parallelism is kept, and for a set of levels of decoding parallelism, information relating to HEVC profile and HEVC level that the decoder is capable of decoding is kept.

A method for encoding a bitstream representing a sequence of pictures of a video stream is also provided. In the method, a parameter is received from a transmitting apparatus that should decode the encoded bitstream.

12 Claims, 11 Drawing Sheets

Related U.S. Application Data continuation of application No. 14/410,968, filed as application No. PCT/SE2013/050805 on Jun. 27, 2013, now Pat. No. 10,142,622.

(60) Provisional application No. 61/666,056, filed on Jun. 29, 2012.

(51) Int. Cl.
  *H04N 19/46* (2014.01)
  *H04N 19/196* (2014.01)
  *H04N 19/156* (2014.01)

(56) References Cited

U.S. PATENT DOCUMENTS

| | | | | |
|---|---|---|---|---|
| 2013/0177070 | A1* | 7/2013 | Seregin | H04N 19/129 |
| | | | | 375/240.02 |
| 2013/0188698 | A1* | 7/2013 | Chien | H04N 19/61 |
| | | | | 375/240.12 |

OTHER PUBLICATIONS

Worrall (ASPEX) S: "AHG4: Profile Requirements For Facilitation Of Parallel Tile Decoding", 9. JCT-VC Meeting 100. MPEG Meeting; Apr. 27, 2012-Jul. 5, 2012; Geneva; (Joint Collaborative Team On Video Coding of ISO/IEC JTC1/SC29/WG11 and ITU-T SG.16 ); URL: http://wftp3.itu.int/av-arch/jctvc-site/,, No. JCTVC-I0462, Apr. 20, 2012 (Apr. 20, 2012), XP030112225.

Samuelsson J et al: "Decoder parallelism indication", 10. JCT-VC Meeting; 101. MPEG Meeting; Nov. 7, 2012-Jul. 20, 2012; Stockholm; (Joint Collaborative Team On Video Coding of ISO/IEC JTC1/SC29/WG11 and ITU-T SG.16); URL: http://wftp3.itu.int/av-arch/jctvc-site/,, No. JCTVC-J0249, Jul. 2, 2012 (Jul. 2, 2012), XP030112611.

Samuelsson J et al: "Decoder parallelism indication", 11. JCT-VC Meeting; 102. MPEG Meeting; Oct. 10, 2012-Oct. 19, 2012; Shanghai; (Joint Collaborative Team On Video Coding of ISO/IEC JTC1/SC29/WG11 and ITU-T SG.16); URL: http://wftp3.itu.int/av-arch/jctvc-site/,, No. JCTVC-K0236, Oct. 1, 2012 (Oct. 1, 2012), XP030113118.

"Control protocol for multimedia communication; H.245 (Oct. 2005)", ITU-T Standard in Force (I), International Telecommunication Union, Geneva, CH, No. H.245 (Oct. 2005), Oct. 7, 2005 (Oct. 7, 2005), XP017404767.

Andreasen Cisco Systems F: "Session Description Protocol (SDP) Simple Capability Declaration; rfc3407.txt", Oct. 1, 2002, Oct. 1, 2002 (Oct. 1, 2002), XP015009162, ISSN: 0000-0003.

"Series H: Audiovisual and Multimedia Systems Infrastructure of audiovisual services—Coding of moving video, High efficiency video coding; ITU-T H.265, Telecommunication Standardization Sector of ITU, (Apr. 2013)", International Telecommunication Union, 317 pages.

Office Action dated Apr. 13, 2017, issued in Chinese Patent Application No. 201380034277.X, 3 pages.

European Communication dated Jan. 18, 2018, issued in European Patent Application No. 13737453.4, 7 pages.

Rosenberg, J., Schulzrinne, H., "An Offer/Answer Model with the Session Description Protocol (SDP)" RFC 3264, Jun. 2002, 26 pages.

* cited by examiner

APPARATUS AND METHODS THEREOF FOR VIDEO PROCESSING

CROSS REFERENCE TO RELATED APPLICATION(S)

This application is a continuation of U.S. application Ser. No. 16/193,488, filed Nov. 16, 2018, which is a continuation of U.S. application Ser. No. 14/410,968, filed Dec. 23, 2014 (now U.S. Pat. No. 10,142,622), which is a 35 U.S.C. § 371 National Phase Entry Application from PCT/SE2013/050805, filed Jun. 27, 2013, designating the United States, and also claims the benefit of U.S. Provisional Application No. 61/666,056, filed Jun. 29, 2012. Each of the disclosures of the referenced applications are incorporated herein by reference in their entirety.

TECHNICAL FIELD

The embodiments relate to apparatus, and methods thereof for improving coding performance when parallel encoding/decoding is possible.

BACKGROUND

High Efficiency Video Coding (HEVC) is a video coding standard being developed in Joint Collaborative Team—Video Coding (JCT-VC). JCT-VC is a collaborative project between Moving Picture Experts Group (MPEG) and International Telecommunication Union—Telecommunication Standardization Sector (ITU-T). Currently, an HEVC Model (HM) is defined that includes a number of tools and is considerably more efficient than H.264/Advanced Video Coding (AVC).

HEVC is a block based hybrid video coded that uses both inter prediction (prediction from previous coded pictures) and intra prediction (prediction from previous coded pixels in the same picture). Each picture is divided into quadratic treeblocks (corresponding to macroblocks in H.264/AVC) that can be of size 4×4, 8×8, 16×16, 32×32 or 64×64 pixels. A variable CtbSize is used to denote the size of treeblocks expressed as number of pixels of the treeblocks in one dimension i.e. 4, 8, 16, 32 or 64.

Regular slices are similar as in H.264/AVC. Each regular slice is encapsulated in its own Network Abstraction Layer (NAL) unit, and in-picture prediction (intra sample prediction, motion information prediction, coding mode prediction) and entropy coding dependency across slice boundaries are disabled. Thus a regular slice can be reconstructed independently from other regular slices within the same picture. Since the treeblock, which is a basic unit in HEVC, can be of a relatively big size e.g., 64×64, a concept of "fine granularity slices" is included in HEVC to allow for Maximum Transmission Unit (MTU) size matching through slice boundaries within a treeblock, as a special form of regular slices. The slice granularity is signaled in a picture parameter set, whereas the address of a fine granularity slice is still signaled in a slice header.

Figure 1:
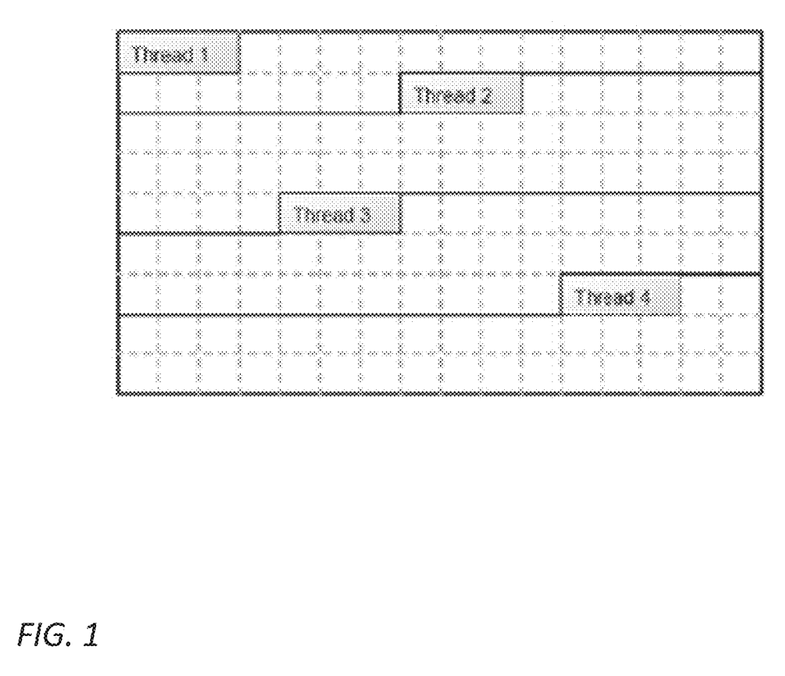
FIG. 1 illustrates an example of threaded decoding using slices according to prior art.

The regular slice is the only tool that can be used for parallelization in H.264/AVC. Parallelization implies that parts of a single picture can be encoded and decoded in parallel as illustrated in FIG. 1 where threaded decoding can be used using slices. Regular slices based parallelization does not require much inter-processor or inter-core communication.

However, for the same reason, regular slices can require some coding overhead due to the bit cost of the slice header and due to the lack of prediction across the slice border. Further, regular slices (in contrast to some of the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Figure 2:
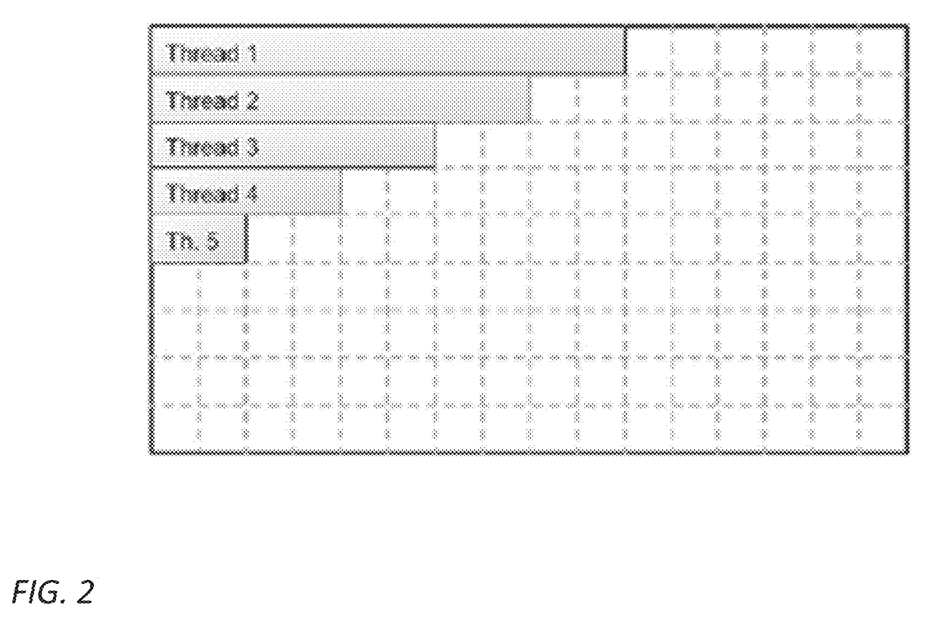
FIG. 2 illustrates an example of threaded decoding using wavefronts according to prior art.

In wavefront parallel processing (WPP), the picture is partitioned into single rows of treeblocks. Entropy decoding and prediction are allowed to use data from treeblocks in other partitions. Parallel processing is possible through parallel decoding of rows of treeblocks, where the start of the decoding of a row is delayed by two treeblocks, so to ensure that data related to a treeblock above and to the right of the subject treeblock is available before the subject treeblock is being decoded. Using this staggered start (which appears like a wavefront when represented graphically as illustrated in FIG. 2), parallelization is possible with up to as many processors/cores as the picture contains treeblock rows. Due to the permissiveness of in-picture prediction between neighboring treeblock rows within a picture, the required inter-processor/inter-core communication to enable in-picture prediction can be substantial. The WPP partitioning does not result in the production of additional NAL units compared to when it is not applied, thus WPP cannot be used for MTU size matching. A wavefront segment contains exactly one line of treeblocks.

Figure 3:
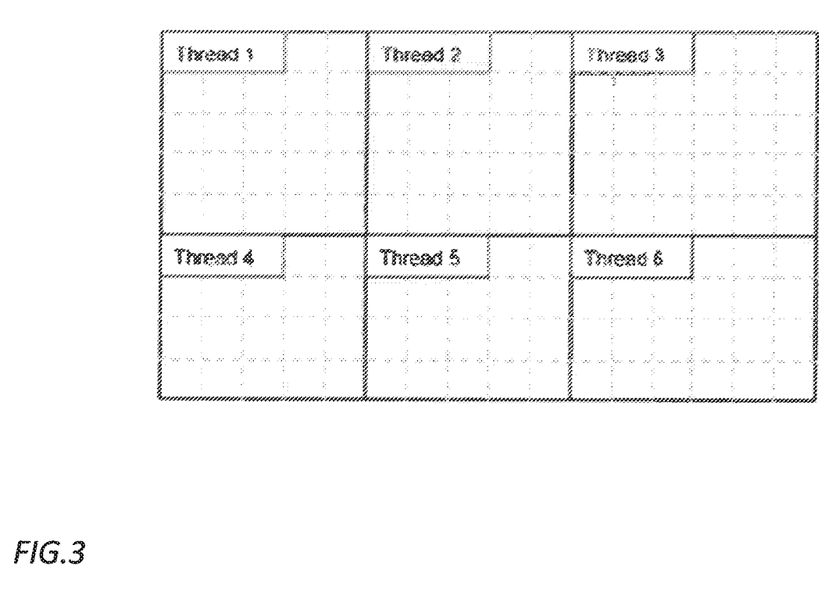
FIG. 3 illustrates an example of threaded decoding using tiles according to prior art.

Tiles define horizontal and vertical boundaries that partition a picture into tile columns and rows. That implies that the tiles in HEVC divide a picture into areas with a defined width and height as illustrated in FIG. 3. Each area of the tiles consists of an integer number of treeblocks that are processed in raster scan order. The tiles themselves are processed in raster scan order throughout the picture. The exact tile configuration or tile information (number of tiles, width and height of each tile etc) can be signaled in a sequence parameter set (SPS) and in a picture parameter set (PPS). The tile information contains the width, height and position of each tile in a picture. This means that if the coordinates of a block is known, it is also known what tile the block belongs to.

For simplicity, restrictions on the application of the different picture partitioning schemes are specified in HEVC. Tiles and WPP may not be applied at the same time. Furthermore, for each slice and tile, either or both of the following conditions must be fulfilled: 1) all coded treeblocks in a slice belong to the same tile; 2) all coded treeblocks in a tile belong to the same slice.

The Sequence Parameter Set (SPS) holds information that is valid for an entire coded video sequence. Specifically it holds the syntax elements profile_idc and level_idc that are used to indicate which HEVC profile and HEVC level a bitstream conforms to. The HEVC profiles and the HEVC levels specify restrictions on bitstreams and hence limits on the capabilities needed to decode the bitstreams. The HEVC profiles and the HEVC levels may also be used to indicate interoperability points between individual decoder implementations. The HEVC level enforces restrictions on the bitstream for example on the Picture size (denoted MaxLumaFS expressed in luma samples) and sample rate (denoted MaxLumaPR expressed in luma samples per second) as well as max bit rate (denoted MaxBR expressed in bits per second) and max coded picture buffer size (denoted Max CPB size expressed in bits).

The Picture Parameter Set (PPS) holds information that is valid for some (or all) pictures in a coded video sequence. The syntax element tiles_or_entropy_coding_sync_idc controls the usage of wavefronts and tiles and it is required to have same value in all PPSs that are active in the same coded video sequence.

Moreover, both HEVC and H.264 define a video usability information (VUI) syntax structure, that can be present in a sequence parameter set and contains parameters that do not affect the decoding process, i.e. do not affect the pixel values. Supplemental Enhancement Information (SEI) is another structure that can be present in any access unit and that contains information that does not affect the decoding process.

Hence, as mentioned above, compared to H.264/AVC, HEVC provides better possibilities for parallelization. Specifically tiles and WPP are tools developed for parallelization purposes. Both were originally designed for encoder parallelization but they may also be used for decoder parallelization.

When tiles are being used for encoder parallelism, the encoder first chooses a tile partitioning. Since tile boundaries break all predictions between the tiles, the encoder can assign the encoding of multiple tiles to multiple threads. As soon as there are at least two tiles, multiple thread encoding can be done.

Accordingly, in this context, the fact that a number of threads can be used, implies that the actual workload of the encoding/decoding process can be divided into separate "processes" that are performed independently of each other, i.e. they can be performed in parallel in separate threads as shown in FIG. 3.

HEVC defines two types of entry points for parallel decoding. Entry points can be used by a decoder to find the position in the bitstream where the bits for a tile or substream starts. The first type is entry points offsets. Those are listed in the slice header and indicates starting points of one or more tiles that are contained in the slice. The second type is entry point markers which separates tiles in the bitstream. An entry point marker is a specific codeword (start code) which cannot occur anywhere else in the bitstream.

Thus for decoder parallelism to work, there needs to be entry points in the bitstream. For parallel encoding, there does not need to be entry points, the encoder can just stitch the bitstream together after the encoding of the tiles/substreams are complete. However, the decoder needs to know where each tile starts in the bitstream in order to decode in parallel. If an encoder only wants to encode in parallel but does not want to enable parallel decoding, it could omit the entry points, but if it also wants to enable decoding in parallel it must insert entry points.

There are different ways of establishing multimedia session including HEVC video.

Dynamic Adaptive Streaming over HTTP (DASH) is an adaptive bitrate streaming technology where a multimedia file is partitioned into one or more segments and delivered to a client using HTTP. A media presentation description (MPD) describes segment information (timing, URL, media characteristics such as video resolution and bit rates). Segments can contain any media data, however the specification provides specific guidance and formats for use with two types of containers: MPEG-4 file format or MPEG-2 Transport Stream.

DASH is audio/video codec agnostic. One or more representations (i.e., versions at different resolutions or bit rates) of multimedia files are typically available, and selection can be made based on network conditions, device capabilities and user preferences, enabling adaptive bitrate streaming.

"Offer/Answer Model with the Session Description Protocol (SDP)" defines a mechanism by which two entities can make use of the Session Description Protocol (SDP) to arrive at a common view of a multimedia session between them. In the model, one participant offers the other a description of the desired session from their perspective, and the other participant answers with the desired session from their perspective. This offer/answer model is most useful in unicast sessions where information from both participants is needed for the complete view of the session. The offer/answer model is used by protocols like the Session Initiation Protocol (SIP).

SUMMARY

The object of the embodiments of the present invention is to improve the performance when parallel encoding/decoding is available.

That is achieved by providing the receiving apparatus and the transmitting apparatus and methods thereof. If the methods of the transmitting apparatus and the receiving apparatus are combined a negotiation process is provided which can improve the performance.

According to a first aspect a method to be performed by a receiving apparatus for decoding an encoded bitstream representing a sequence of pictures of a video stream is provided. In the method, capabilities relating to level of decoding parallelism for a decoder of the receiving apparatus are identified, a parameter indicative of decoder capabilities relating to level of decoding parallelism is kept, and for a set of levels of decoding parallelism, information relating to HEVC profile and HEVC level that the decoder is capable of decoding is kept.

According to a second aspect of the embodiments a method for encoding a bitstream representing a sequence of pictures of a video stream is provided. In the method, a parameter is received from a transmitting apparatus that should decode the encoded bitstream, wherein the parameter is indicative of the decoder's capabilities relating to level of decoding parallelism, and decoder capabilities relating to HEVC profile and HEVC level that the decoder is capable of decoding for a set of levels of decoding parallelism. Further, an encoder configuration is selected such that the HEVC profile is equal to the received HEVC profile, that the HEVC level is lower than or equal to the received HEVC level and that the level of parallelism is greater than or equal to the level of parallelism indicated in the received parameter.

According to a third aspect of embodiments, an apparatus for receiving (also referred to as receiving apparatus) and decoding a bitstream representing a sequence of pictures of a video stream is provided. The apparatus comprises a processor and memory, said memory containing instructions executable by said processor whereby said apparatus is operative to identify capabilities relating to level of decoding parallelism for a decoder of the apparatus, keep a parameter indicative of decoder capabilities relating to level of decoding parallelism, and for a set of levels of decoding parallelism, keep information relating to HEVC profile and HEVC level that the decoder is capable of decoding.

According to a fourth aspect of embodiments, an apparatus for transmitting (also referred to as transmitting apparatus) and encoding a bitstream representing a sequence of pictures of a video stream is provided. The apparatus comprises a processor and memory, said memory containing instructions executable by said processor whereby said apparatus is operative to receive from a decoder, that should decode the encoded bitstream, a parameter indicative of decoder capabilities relating to level of decoding parallelism, and decoder capabilities relating to HEVC profile and HEVC level that the decoder is capable of decoding for a set of levels of decoding parallelism, and select an encoder configuration such that the HEVC profile is equal to the received HEVC profile, that the HEVC level is lower than or equal to the received HEVC level and that the level of parallelism is greater than or equal to the level of parallelism indicated in the received parameter.

An advantage with some embodiments of the present invention is the ability of a video decoder to decode a higher quality video that would otherwise have been possible, by parallelizing the decoding process to utilize video decoding processing blocks more efficiently. By signaling a set of parallelization properties to the video encoder, the video encoder can apply those properties to the encoded data such that the video decoder can make use of them. By e.g. signaling more than one set of parallelization properties to the video encoder, there is a higher probability that the video encoder can find a match between the generated video stream parallelization properties that the video encoder is able to generate and the video stream parallelization properties the video decoder is able to make use of.

DETAILED DESCRIPTION

Both encoders and decoders have limitations regarding their respective capabilities for parallelism. I.e. each encoder is capable of encoding a bitstream up to a certain level of parallelism and each decoder is capable of decoding a bitstream with a certain level of parallelism.

Further, HEVC specifies a number of profiles (and restricted versions thereof) and a number of levels, also referred to as HEVC profiles and HEVC levels.

A profile is a defined set of coding tools that can be used to create a bitstream that conforms to that profile. An encoder for a profile may choose which coding tools to use as long as it generates a conforming bitstream while a decoder for a profile must support all coding tools that can be used in that profile. In this specification a "HEVC profile" should be used in the general sense as long as it fits the above description; categorizations, organizations and sub-divisions of "native" HEVC profiles extends and/or puts additional restrictions to the profile identifier value space and does not impact the embodiments.

The HEVC standard defines thirteen levels and two tiers, wherein each level indicates a complexity for a set of coding tools and a tier is a categorization of levels. A level is a set of constraints for a bitstream. The high levels are designed for demanding applications. Likewise, high tiers are designed for demanding applications. A decoder that conforms to a given level is required to be capable of decoding all bitstreams that are encoded for that level and for all lower levels. A level of a higher tier is considered higher than any level of a lower tier. In this invention, a "HEVC level" should be used in the general sense as long as it fits the above description; categorizations, organizations and sub-divisions (such as tiers) of "native" HEVC levels extends and/or puts additional restrictions to the level identifier value space and do not impact the invention.

For HEVC applications it is specified which level that is required, which implies that the encoder and the decoder must be able to support the required level for supporting that application.

In order to improve the encoding/decoding process, a parameter is according to embodiments introduced that can be used by a decoder to indicate that it is capable of using a certain level of parallelism when decoding. The parameter is referred to as parameter Y and is exemplified by a vector, wherein the vector elements are parallelism levels supported by the decoder. The parameter is denoted the parameter Y.

Figure 4:
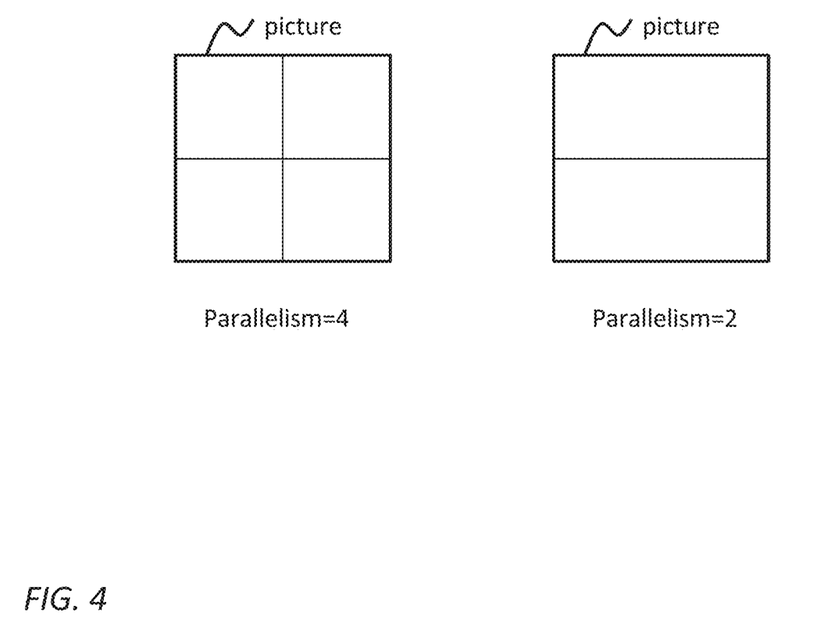
FIG. 4 exemplifies parallelism levels according to prior art.

Hence, the level of parallelism indicates the number of threads that can be used. Referring to FIG. 4, where one picture is divided into four independent parts that can be decoded in parallel, the level of parallelism is four and the other picture is divided into two independent parts that can be decoded in parallel, the level of parallelism is two.

Accordingly, the decoder is configured to identify its capabilities relating to parallelism and the capability information can be used when determining a suitable level of parallelism.

Information relating to at least one of HEVC profile and an HEVC level is provided for a set of levels of parallelism. This is exemplified by the table below:

| parallelism | HEVC profile | HEVC level |
|---|---|---|
| n | A | m |
| n | B | L |
| n + 1 | A | m + 1 |
| n + 1 | B | L |
| n + 2 | A | m + 2 |
| n + 2 | B | L + 1 |
| n + 3 | A | m + 2 |
| n + 3 | B | L + 1 |

Accordingly, for each HEVC profile it is indicated in the table the highest possible HEVC level that is supported for each level of parallelism. Note that a single level of parallelism can map to one or more HEVC profiles. As mentioned above, each HEVC application prefers a certain HEVC profile and HEVC level. That implies that the encoder has to provide the decoder with an encoded bitstream fulfilling that HEVC level. At the same time, the encoder and the decoder parallelism capabilities need to be taken into account. The encoded bitstream also need to be encoded with a parallelism level that the decoder is capable of decoding.

Figure 5:
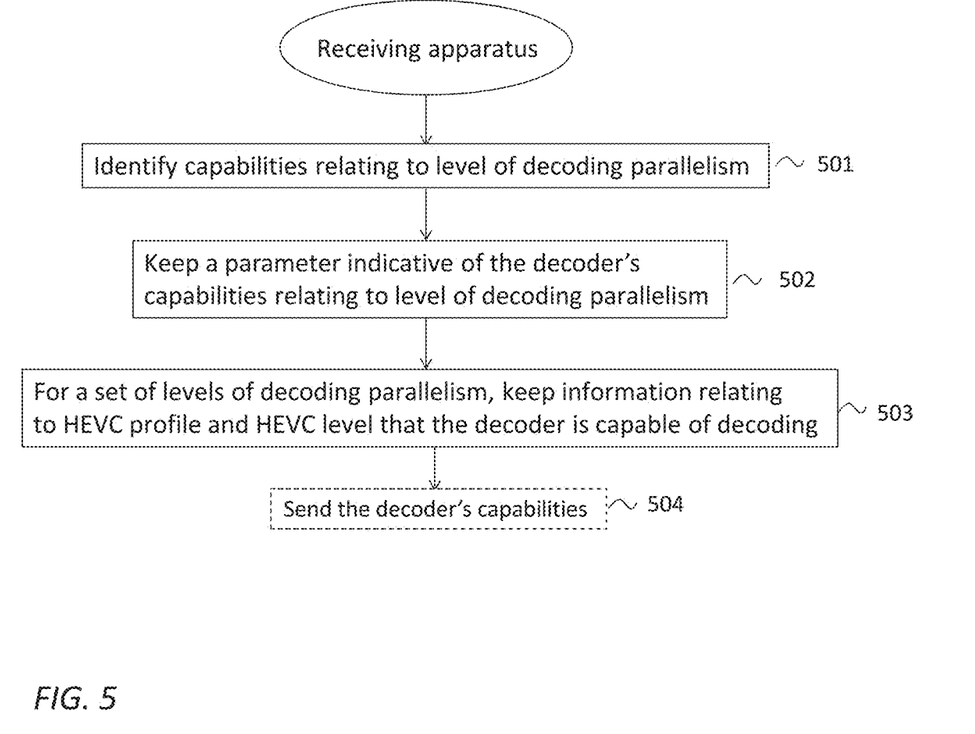
FIG. 5 illustrates a flowchart of a method performed by a decoder according to one embodiment.

According to embodiments of the present invention a method to be performed by a receiving apparatus for decoding an encoded bitstream representing a sequence of pictures of a video stream is provided as illustrated in the flow charts of FIG. 5. Capabilities relating to level of decoding parallelism for the decoder are identified 501 and a parameter Y indicative of the decoder's capabilities relating to level of decoding parallelism is introduced (kept) 502. For a set of levels of decoding parallelism (exemplified by n, n+1, n+2, n+3), keep 503 information relating to HEVC profile and HEVC level that the decoder is capable of decoding for the respective level parallelism. It should be noted that the terms parallelism and decoding parallelism are used interchangeably. The decoder capabilities can then be sent 504 to the encoder by e.g. using a parameter indicative of the decoder's capabilities relating to level of decoding parallelism, and the decoder's capabilities relating to HEVC profile and HEVC level that the decoder is capable of decoding.

Hence by using the parameter Y, and the information relating to HEVC level and HEVC profile a certain set of bitstreams e.g. all bitstreams that conforms to a specific HEVC profile and HEVC level, makes it possible to decode the certain set of bitstreams using a certain level of parallelism.

Furthermore, a negotiation process can also be performed between two parts, a receiver and a transmitter, exemplified with the encoder and the decoder. An example is one receiver of media (e.g. a decoder of a user device) and one provider of media such as an encoder of a video camera. Another example is two video communication clients that both will send and receive video, hence both clients have both encoder and decoder.

The parameter Y indicative of the decoder's capabilities relating to a level of parallelism is used along with HEVC profile and HEVC level information in the negotiation of settings for the encoded video such that the capabilities of the decoder can be utilized in a way that a certain HEVC level can be guaranteed and at the same time select a level of parallelism that both the encoder and the decoder can manage. It should be noted that although the entities below are referred to as receiver and transmitter, the transmitter comprises an encoder for encoding the bitstream and the receiver comprises a decoder for decoding the encoded bitstream. Therefore the receiver is adapted to receive the encoded bitstream but it may also be configured to transmit signaling information such as the parameter Y. Correspondingly, the transmitter is adapted to transmit the encoded bitstream but it may also be configured to receive signaling information such as the parameter Y.

Figure 6:
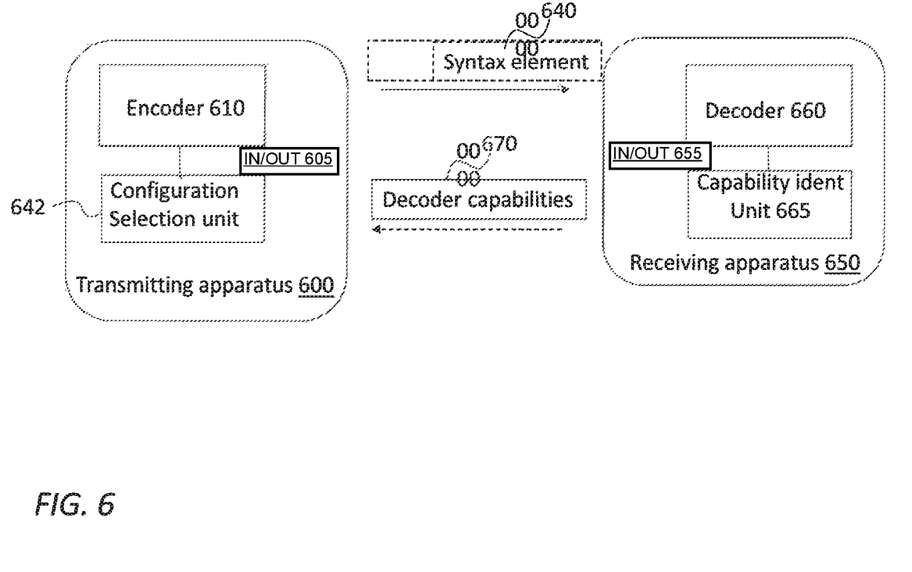
FIG. 6 illustrates schematically a scenario of embodiments of the present invention.

A transmitting apparatus (also referred to as transmitter) and a receiving apparatus (also referred to as receiver) are exemplified in FIG. 6. The transmitting apparatus 600 comprises an encoder 410 and an in/out-put unit 605. Further, a configuration selection unit 642 is provided for selecting an encoder configuration regarding e.g. parallelism level, HEVC profile and HEVC level e.g. based on encoder capabilities and information of decoder capabilities received from the receiving apparatus 650. The in/out-put unit 605 is configured to receive information on decoder capabilities and to send the encoded bitstream and it may also send a syntax element to the decoder indicating the level of parallelism that is required for decoding the bitstream. The receiving apparatus 650 comprises a decoder 660, an in/out-put unit 655 and a capability identification unit configured to identify the decoder capabilities regarding the parallelism levels that are supported. The in/out-put unit 655 is configured to send information on decoder capabilities 670 and to receive the encoded bitstream and it may also receive a syntax element from the encoder indicating the level of parallelism that is required for decoding the bitstream. The decoder capabilities comprise the parameter Y in combination with e.g. HEVC profile and HEVC level for e.g. a number of HEVC profiles.

A receiver 650 such as a client comprising the decoder 660 can be configured to perform the following steps.

1. The receiver 650 is configured to determine for a specific HEVC profile what HEVC level its decoder is capable of decoding given a specific value of the parameter Y. It should be noted that this procedure can be repeated for a number of HEVC profiles.
2. The receiver 650 is configured to communicate to the transmitter a list of pairs; comprising HEVC level and parameter Y, or triples comprising; HEVC profile, HEVC level and parameter Y for a number of vector elements of parameter Y. Usually, the decoder is not aware of which level of parallelism that the encoder supports, therefore a number of vector elements of parameter Y is provided. It should also be noted that the parameter Y may comprise multiple vector elements with the same value, but which are associated with different HEVC profiles if the decoder of the receiver supports multiple HEVC profiles.

Alternatively, the receiver may be configured to perform the following steps.

1. The receiver is configured to determine for a specific HEVC profile what value of the parameter Y it, at least, needs to be capable of decoding given a specific HEVC level. It should be noted that this procedure can be repeated for a number of HEVC profiles.
2. The receiver is configured to communicate to the transmitter a list of pairs; level and the parameter Y or triples; HEVC profile, HEVC level and the parameter Y for at least one HEVC level, including the given specific HEVC level. If the targets for HEVC profile and HEVC level is known, it may be enough to send the lowest level of parallelism that fulfills that combination of HEVC profile and HEVC level, wherein said lowest level of parallelism is lower than or equal to the highest level of parallelism that is supported.

With further reference to the negotiation process, the transmitter may be configured to perform the following steps:

1. The transmitter such as a client comprising the encoder, is configured to receive a list of pairs comprising; HEVC level and the parameter Y or triples comprising; HEVC profile, HEVC level and the parameter Y that the receiver is capable of decoding. Let's call each element, pair or triple in that list Pi where i represents its position in the list. The transmitter is configured to select an element Pz and to encode with an encoder configuration such that the profile is equal to what was indicated in Pz, the HEVC level is lower than or equal to what was indicted in Pz and the level of parallelism that the bitstream is encoded with is greater than or equal to the Y that was indicated in Pz. However, the level of parallelism that is used for encoding the bitstream is not allowed to exceed the maximum level of parallelism that the decoder is capable of handling.

The embodiments are not limited to only take into account these two or three parameters (HEVC profile, HEVC level and parameter Y) but there could be a large number of other parameters (such as tiers and constraints of profiles) included in the negotiation including but not limited to frame rate, resolution and bitrate.

Moreover, the embodiments are applicable to a client, for example a video player for video streamed over the internet, that also comprises a video decoder. The configuration selection unit 642 of the client is configured to use the information of the parameter Y, HEVC profile, HEVC level to select coded video sequences that the video decoder, is capable of decoding.

Thus, in many scenarios there are multiple coded video sequences, i.e. representations of the same video content available for the client to select from. The different representations could for example be encoded with different resolution and/or bitrate resulting in different HEVC levels or with different set of tools resulting in different HEVC profiles. The client makes a selection of which representation to retrieve and decode for example based on the available bandwidth and/or its decoder capabilities.

To improve the selection of representation based on decoder capabilities, the parameter Y together with HEVC level and profile information is used by the client when selecting which representation to decode according to embodiments of the present invention.

Figure 7:
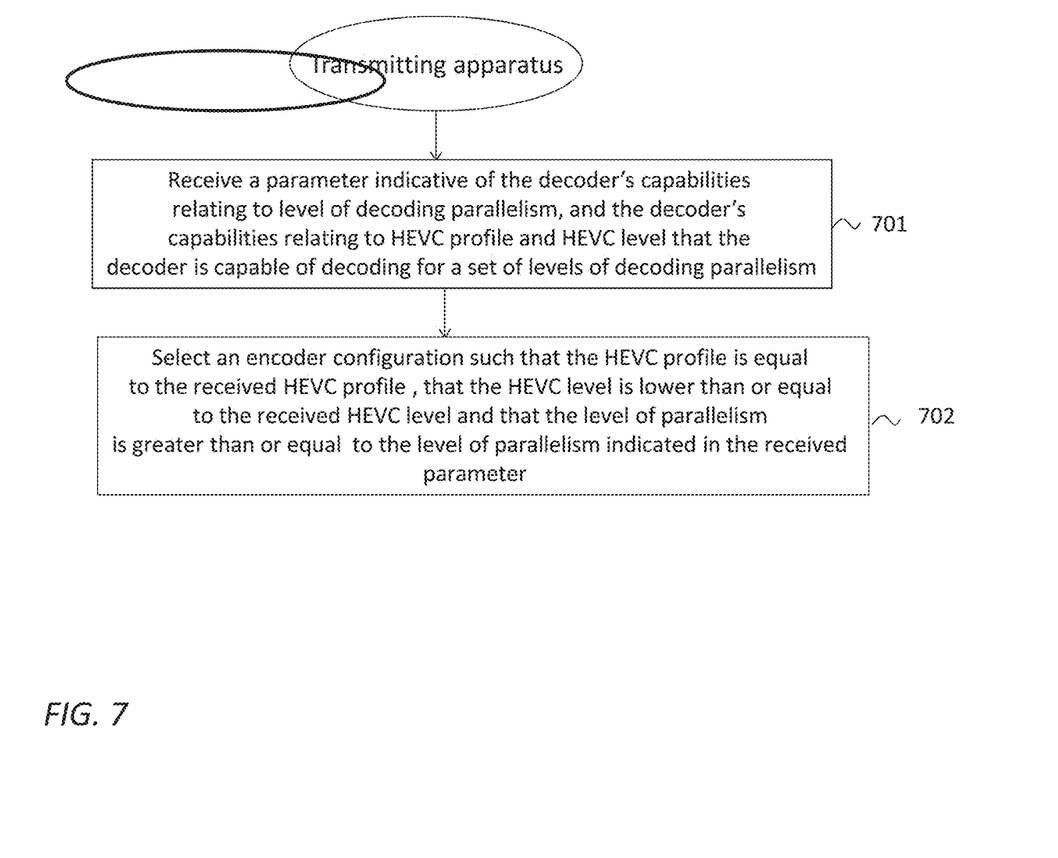
FIGS. 7-8 show flowcharts of methods illustrating different embodiments.

Therefore according to embodiments of the present invention, a client is provided. The client, exemplified by a video camera/video player, comprising both an encoder for encoding a bitstream and a decoder for decoding said bitstream, wherein the bitstream may be displayed. Thus the client can be configured to act as a receiving apparatus according to the embodiments described above and as a transmitting apparatus. The transmitting apparatus is configured to perform the method as illustrated in FIG. 7.

The transmitting apparatus receives 701 from a decoder, that should decode the encoded bitstream, a parameter indicative of the decoder's capabilities relating to level of decoding parallelism, and the decoder's capabilities relating to HEVC profile and HEVC level that the decoder is capable of decoding for a set of levels of decoding parallelism. Further the transmitting apparatus selects 702 an encoder configuration such that the HEVC profile is equal to the received HEVC profile, that the HEVC level is lower than or equal to the received HEVC level and that the level of parallelism is greater than or equal to the level of parallelism indicated in the received parameter. The transmitting apparatus can also 703 use an HEVC profile equal to or lower than a maximum HEVC profile and an HEVC level equal to or lower than a maximum HEVC level for a level of decoding parallelism according to the received parameter and select 704 an encoded representation as shown in the flowchart of FIG. 9b.

With reference again to FIG. 5, the receiving apparatus identifies 501 capabilities relating to level of decoding parallelism for the decoder, keeps 502 a parameter indicative of the decoder's capabilities relating to level of decoding parallelism, and for a set of levels of decoding parallelism, keeps 503 information relating to HEVC profile and HEVC level that the decoder is capable of decoding.

Figure 8:
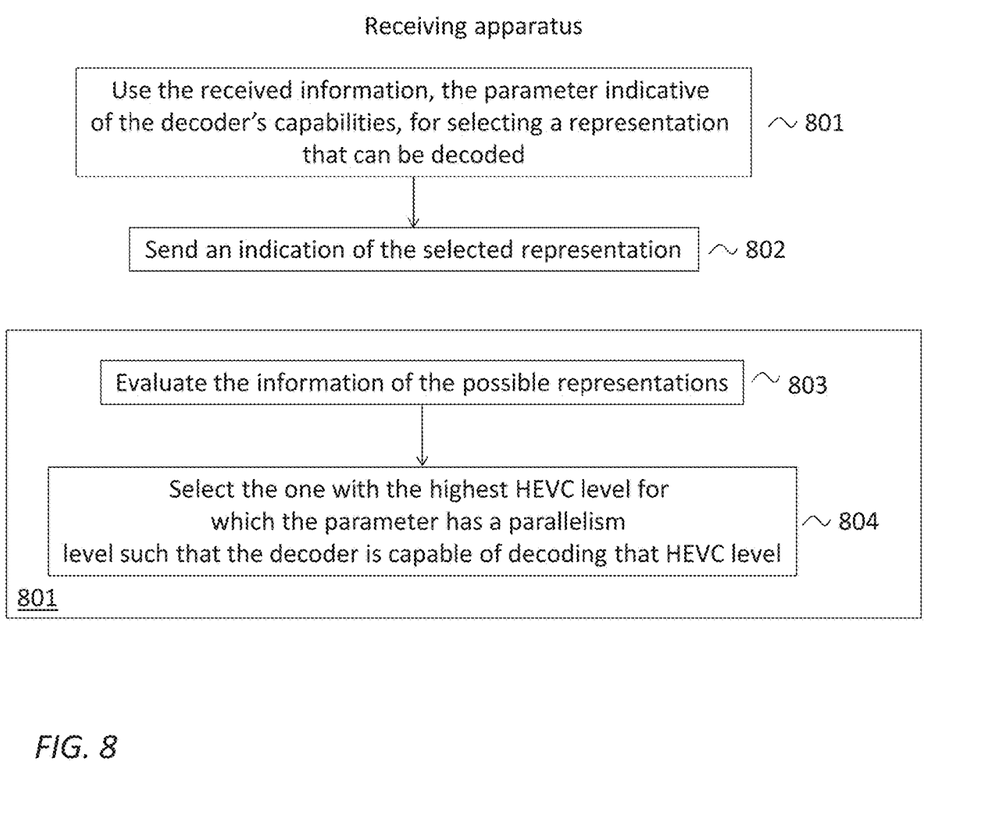

According to an embodiment as illustrated in the flowchart of FIG. 8, the receiving apparatus receives information of available representations of the encoded bitstream that can be provided by an encoder and it uses 801 the received information, (i.e. the parameter indicative of the decoder's capabilities relating to level of decoding parallelism, and the decoder's capabilities relating to HEVC profile and HEVC level that the decoder is capable of decoding) for selecting a representation that can be decoded, and sends 802 an indication of the selected representation.

The representation that can be encoded can be selected by evaluating 803 the information of the possible representations, and selecting 804 the one with the highest HEVC level for which the parameter has a parallelism level such that the decoder is capable of decoding that HEVC level.

Figure 9A:
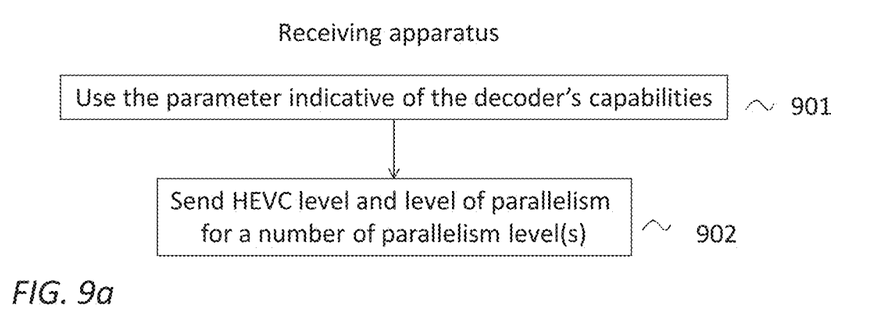
FIGS. 9a-9b show flowcharts of methods illustrating different embodiments.
Figure 9B:
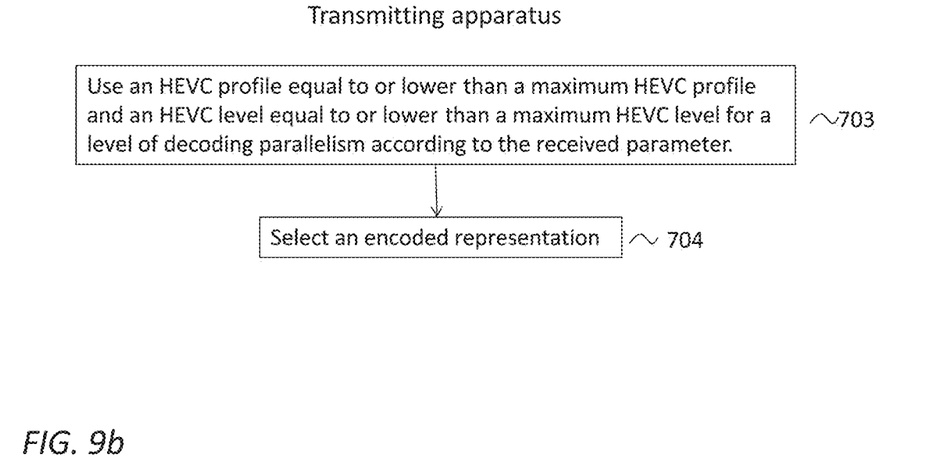

With reference to FIG. 9a, the parameter indicative of the decoder's capabilities relating to level of decoding parallelism, and the decoder's capabilities relating to HEVC profile and HEVC level that the decoder is capable of decoding can be used 901 for determining at least one HEVC level the decoder capable of decoding given a specific level of parallelism, and HEVC level and level of parallelism are sent 902 for a number of parallelism levels.

According to a further embodiment, the parameter indicative of the decoder's capabilities relating to level of decoding parallelism, and the decoder's capabilities relating to HEVC profile and HEVC level that the decoder is capable of decoding is used 901 for determining at least one level of parallelism the decoder needs to be capable of decoding given a specific HEVC level, and HEVC level and level of parallelism are sent for a number of HEVC level(s).

The sending of the parameter and the decoder's capabilities relating to HEVC profile and HEVC level that the decoder is capable of decoding may be done by using SDP Offer/Answer or DASH.

According to one possible implementation, the client may be configured to perform the following steps.
 1. The client is configured to determine the maximum HEVC level its decoder is capable of decoding given a specific value of the received parameter Y and possibly also given the highest received HEVC profile.
 2. The client is configured to select a representation that is encoded according to the specific value of the received parameter Y and has a HEVC level and e.g. also HEVC profile that is equal to or lower than the maximum HEVC level (and e.g. also HEVC profile) the decoder is capable of decoding for that specific value of the parameter Y. Accordingly, the client can select a representation with an encoding, wherein information of the parallelism can be indicated by a value of a syntax element and has a HEVC level that is equal to or lower than the maximum HEVC level the decoder is capable of decoding for that specific value of the parameter Y which is equal to the used value of the syntax element.

According to another alternative implementation, the client may be configured to perform the following steps.
 1. The client is configured to determine the minimum value of the parameter Y a bitstream must be encoded with in order for its decoder to be capable of decoding a specific HEVC profile and level.
 2. The client is configured to select a representation of a specific HEVC level and possibly HEVC profile that is encoded with a parallelism that is greater than or equal according to the minimum of the received parameter Y.

According to a yet further alternative implementation, the client may be configured to perform the following steps.
 1. The client is configured to evaluate the different representations that are available and to select the one with the highest parallelism level for which the parameter Y has a value such that the decoder is capable of decoding that level of parallelism.

In all alternatives described above there might be other constrains, such as available bitrate or screen resolution that the client has to take into account together with Y, level and profile when selecting representation.

The selection of representation needs not to be done for an entire video stream but may also be applied for segments thereof.

Furthermore, an additional parameter may also be introduced that is used by a decoder to indicate the number of cores it can use at the most for decoding. Such a parameter may be combined with the parameter Y or used as an alternative to the parameter Y.

An example of technology for which the embodiments could be applied is to adaptively select video configuration (for example HEVC profile and level) in a video encoder based on SIP (or RTSP) carrying SDP media description with one or more parallelism level alternatives being signaled from a video decoder by using the parameter Y.

With further reference to FIG. 6, an apparatus for receiving and decoding a bitstream representing a sequence of pictures of a video stream comprising a processor and memory, said memory containing instructions executable by said processor is provided. Said transmitting apparatus is operative to: identify capabilities relating to level of decoding parallelism for the decoder, keep a parameter indicative of the decoder's capabilities relating to level of decoding parallelism, and for a set of levels of decoding parallelism, keep information relating to HEVC profile and HEVC level that the decoder is capable of decoding. Accordingly, the apparatus is operative to perform the methods regarding the steps performed in connection with the decoder according to different embodiments described above.

With yet further reference to FIG. 6, an apparatus for transmitting and encoding a bitstream representing a sequence of pictures of a video stream comprising a processor and memory, said memory containing instructions executable by said processor is provided. Said transmitting apparatus is operative to receive from a decoder, that should decode the encoded bitstream, a parameter 640 indicative of the decoder's capabilities relating to level of decoding parallelism, and the decoder's capabilities relating to HEVC profile and HEVC level that the decoder is capable of decoding for a set of levels of decoding parallelism, and to select an encoder configuration such that the HEVC profile is equal to the received HEVC profile, that the HEVC level is lower than or equal to the received HEVC level and that the level of parallelism is greater than or equal to the level of parallelism indicated in the received parameter 640.

The apparatus is operative to receive the parameter and/or the information by using SDP Offer/Answer and/or to receive the parameter and/or the information by using Dynamic Adaptive HTTP Streaming, DASH. Accordingly, the apparatus is operative to perform the methods regarding the steps performed in connection with the encoder according to different embodiments described above.

Figure 10:
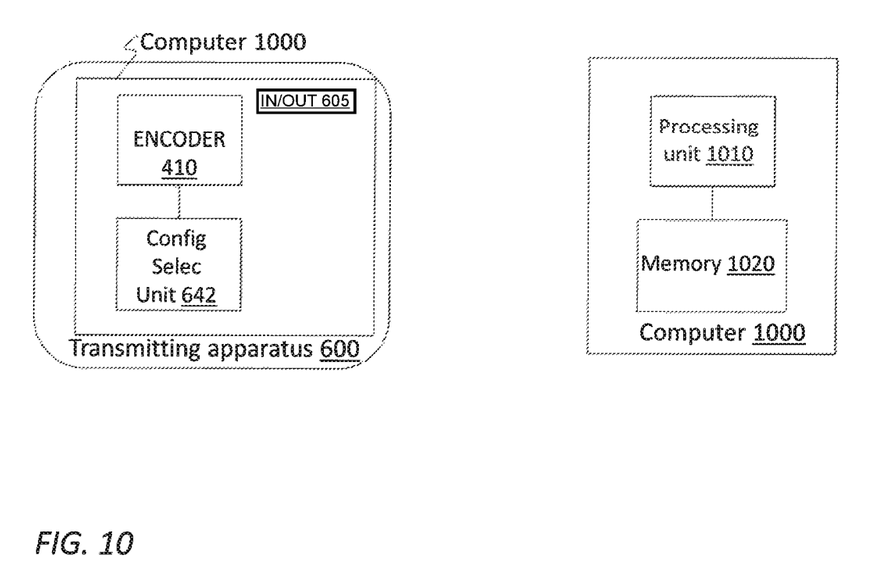
FIGS. 10-11 show computer implementation of embodiments of the present invention.

With reference to FIG. 10, the encoder 610, in/output unit 605 and the configuration selection unit 642 can be implemented by a computer 1000 wherein the processor (processing unit) 1010 of the encoder is configured to execute software code portions stored in a memory 1020, wherein the software code portions when executed by the processor generates the respective encoder methods above.

Figure 11:
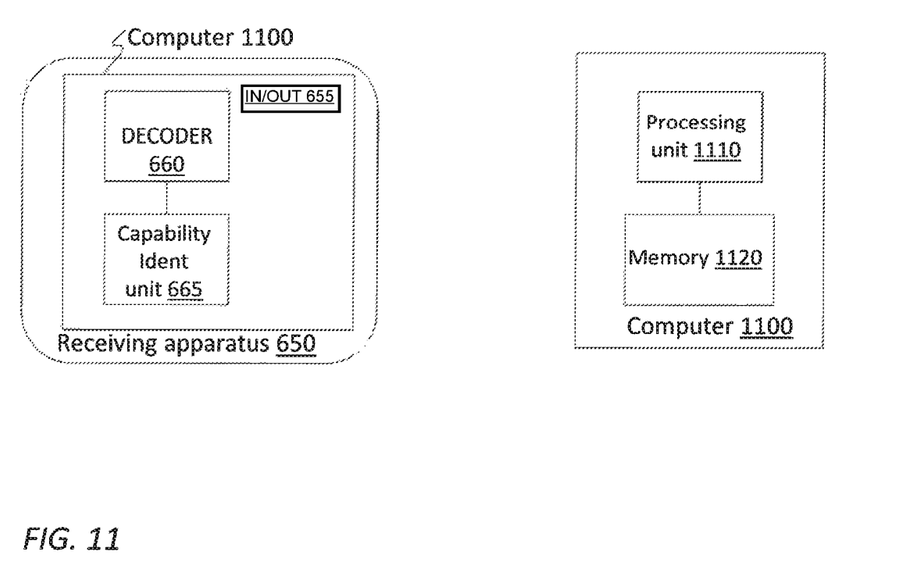

Moreover with reference to FIG. 11, the decoder 660, in/output unit 655 and the capability identification unit 665 can be implemented by a computer 1100 wherein the processor (processing unit) 1110 of the encoder is configured to execute software code portions stored in a memory 1120, wherein the software code portions when executed by the processor generates the respective encoder methods above.

The invention claimed is:

1. A method to be performed by a video camera for decoding an encoded bitstream representing a sequence of pictures of a video stream comprising:
    identifying capabilities relating to level of decoding parallelism for a decoder of the video camera,
    keeping a parameter indicative of decoder capabilities relating to level of decoding parallelism,
    for a set of levels of decoding parallelism, keeping information relating to HEVC profile and HEVC level that the decoder is capable of decoding,
    wherein information of available representations of the encoded bitstream that can be provided by an encoder is received,
    using the received information, the parameter indicative of the decoder capabilities relating to level of decoding parallelism, and the decoder capabilities relating to HEVC profile and HEVC level that the decoder is capable of decoding for selecting a representation that can be decoded,
    sending an indication of the selected representation,
    wherein the step of selecting a representation that can be encoded, further comprises:
    evaluating the information of the possible representations, and
    selecting the one with the highest HEVC level for which the parameter has a parallelism level such that the decoder is capable of decoding that HEVC level.

2. The method according to claim 1, further comprising:
    using the parameter indicative of the decoder capabilities relating to level of decoding parallelism, and the decoder capabilities relating to HEVC profile and HEVC level that the decoder is capable of decoding for determining at least one HEVC level the decoder capable of decoding given a specific level of parallelism, and
    sending HEVC level and level of parallelism for a number of parallelism levels.

3. The method according to claim 1, further comprising:
    using the parameter indicative of the decoder capabilities relating to level of decoding parallelism, and the decoder capabilities relating to HEVC profile and HEVC level that the decoder is capable of decoding for determining at least one level of parallelism the decoder needs to be capable of decoding given a specific HEVC level, and
    sending HEVC level and level of parallelism for a number of HEVC level(s).

4. The method according to claim 1, wherein the method further comprising:
    sending to an encoder, that is providing the encoded bitstream, the parameter indicative of the decoder capabilities relating to level of decoding parallelism, and the decoder's capabilities relating to HEVC profile and HEVC level that the decoder is capable of decoding.

5. The method according to claim 1, wherein the sending of the parameter and the decoder capabilities relating to HEVC profile and HEVC level that the decoder is capable of decoding is done by using SDP Offer/Answer.

6. The method according to claim 1, wherein the sending of the parameter and the decoder capabilities relating to HEVC profile and HEVC level that the decoder is capable of decoding is done by using Dynamic Adaptive HTTP Streaming, DASH.

7. A video camera for receiving and decoding a bitstream representing a sequence of pictures of a video stream comprising a processor and memory, said memory containing instructions executable by said processor whereby said video camera is operative to:
    identify capabilities relating to level of decoding parallelism for a decoder of the video camera,
    keep a parameter indicative of the decoder capabilities relating to level of decoding parallelism, for a set of levels of decoding parallelism, keep information relating to HEVC profile and HEVC level that the decoder is capable of decoding, receive information of available representations of the encoded bitstream that can be provided by an encoder, use the received information, the parameter indicative of the decoder capabilities relating to level of decoding parallelism, and the decoder capabilities relating to HEVC profile and HEVC level that the decoder is capable of decoding for selecting a representation that can be decoded, send an indication of the selected representation, evaluate the information of the possible representations, and select the one with the highest HEVC level for which the parameter has a parallelism level such that the decoder is capable of decoding that HEVC level in order to determine a representation that can be encoded.

8. The video camera according to claim 7, further operative to:

use the parameter indicative of the decoder capabilities relating to level of decoding parallelism, and the decoder capabilities relating to HEVC profile and HEVC level that the decoder is capable of decoding for determining at least one HEVC level the decoder capable of decoding given a specific level of parallelism, and send HEVC level and level of parallelism for a number of parallelism levels.

9. The video camera according to claim 7, further operative to:

use the parameter indicative of the decoder capabilities relating to level of decoding parallelism, and the decoder capabilities relating to HEVC profile and HEVC level that the decoder is capable of decoding for determining at least one level of parallelism the decoder needs to be capable of decoding given a specific HEVC level, and send HEVC level and level of parallelism for a number of HEVC levels.

10. The video camera according to claim 7, further operative to:

send to an encoder, that is providing the encoded bitstream, the parameter indicative of the decoder capabilities relating to level of decoding parallelism, and the decoder capabilities relating to HEVC profile and HEVC level that the decoder is capable of decoding.

11. The video camera according to claim 7, wherein the sending of the parameter and the decoder capabilities relating to HEVC profile and HEVC level that the decoder is capable of decoding is done by using SDP Offer/Answer.

12. The video camera according to claim 7, wherein the sending of the parameter and the decoder capabilities relating to HEVC profile and HEVC level that the decoder is capable of decoding is done by using Dynamic Adaptive HTTP Streaming, DASH.

* * * * *